US006920784B2

United States Patent
Abdolhosseini et al.

(10) Patent No.: US 6,920,784 B2
(45) Date of Patent: Jul. 26, 2005

(54) FLOW CONDITIONING DEVICE

(75) Inventors: Reza Abdolhosseini, West Bloomfield, MI (US); Jim Bielicki, Livonia, MI (US)

(73) Assignee: Visteon Global Technologies, Inc., Van Buren Township, MI (US)

( * ) Notice: Subject to any disclaimer, the term of this patent is extended or adjusted under 35 U.S.C. 154(b) by 0 days.

(21) Appl. No.: 10/464,706

(22) Filed: Jun. 18, 2003

(65) Prior Publication Data

US 2004/0255660 A1 Dec. 23, 2004

(51) Int. Cl.[7] .............................................. G01M 15/00
(52) U.S. Cl. .................................. 73/118.2; 73/204.21
(58) Field of Search ..................... 73/112, 116, 117.2, 73/117.3, 118.1, 118.2, 195, 204.11, 204.21, 204.22

(56) References Cited

U.S. PATENT DOCUMENTS

| | | | |
|---|---|---|---|
| 3,572,391 A | 3/1971 | Hirsch | |
| 4,416,241 A | 11/1983 | Knapp et al. | |
| 4,660,587 A | 4/1987 | Rizzie | |
| 5,029,465 A | * 7/1991 | Tanimura et al. | ........... 73/118.2 |
| 5,090,241 A | 2/1992 | Kobayashi | |
| 5,392,815 A | 2/1995 | Stuart | |
| 5,631,415 A | 5/1997 | Igarashi et al. | |
| 5,918,279 A | 6/1999 | Hecht et al. | |
| 6,112,590 A | * 9/2000 | Rilling | ..................... 73/204.21 |
| 6,145,544 A | 11/2000 | Dutertre et al. | |
| 6,186,179 B1 | 2/2001 | Hill | |
| 6,401,531 B1 | * 6/2002 | Tank et al. | ............... 73/204.21 |
| 2002/0073772 A1 | 6/2002 | Bonne et al. | |
| 2004/0055570 A1 | * 3/2004 | Bielicki et al. | .............. 123/402 |

FOREIGN PATENT DOCUMENTS

| | | |
|---|---|---|
| EP | 0458998 A1 | 5/1990 |
| GB | 2394254 | 4/2004 |
| JP | 10293054 | 4/1997 |

* cited by examiner

*Primary Examiner*—Eric S. McCall
(74) *Attorney, Agent, or Firm*—Brinks Hofer Gilson & Lione

(57) ABSTRACT

The present invention involves an air induction system for inducing ambient air to a vehicle engine. The system comprises an air filter for filtering the ambient air, a clean air duct, a sensor, and a flow conditioning device. The clean air duct is in fluid communication with the air filter and has first and second ends. The first end is connected to the air filter. The sensor is mounted adjacent the second end of the duct. The sensor is configured to receive the ambient air. The flow conditioning device is mounted in the clean air duct and includes an outer body having an air inlet end and an air outlet end. The flow conditioning device has a configuration of connected inner walls disposed within the body and spaced apart from each other by radially increasing intervals from the center of the configuration.

14 Claims, 4 Drawing Sheets

FLOW CONDITIONING DEVICE

TECHNICAL FIELD

The present invention relates to a vehicle air induction system having a flow conditioning device for providing ambient air to an engine of a vehicle.

BACKGROUND

Internal combustion engines today include electronic controls to provide optimal engine operation. One important sensor for achieving optimal engine control is a mass air flow sensor (MAFS) for measuring air intake into an internal combustion engine.

It is important that the mass air flow measurement is accurate to provide optimal engine operation. One significant problem affecting the mass air flow measurement is the turbulence in the air flow that could result in high noise-to-signal output. Prior art flow conditioning devices have attempted to address this problem by providing devices that reduce the turbulence of the entire flow field. While prior art devices reduce the turbulence of the entire flow field, they are susceptible to freezing, provide relatively significant pressure gradient, and even cut off air flow to the engine. Additionally, these devices are bulky and costly to manufacture.

Therefore, there is a need in the automotive industry to improve the design of devices that are compact and deliver low turbulent flow field to the mass air flow sensor without affecting significant pressure drop.

SUMMARY

In one aspect of the present invention, an air induction system installed in a motor vehicle is provided. In this embodiment, the air induction system comprises an air filter, a clean air duct, a mass air flow sensor, a mass air flow sensor housing duct and flow conditioning device. The clean air duct is in fluid communication with the air filter and has first and second ends. The first end is connected to the air filter. The sensor is mounted adjacent the second end of the duct and is configured to receive the ambient air. The flow conditioning device is mounted in the clean air duct and includes an outer body. The outer body has an air inlet end and an air outlet end. The flow conditioning device has a configuration of connected inner walls disposed within the body and spaced apart from each other by radially increasing intervals from the center of the configuration.

Further features and advantages of the invention will become apparent from the following discussion and the accompanying drawings in which:

BRIEF DESCRIPTION OF THE DRAWINGS

FIG. 4b is a side view of the flow conditioning device of FIG. 4a;

FIG. 4c is a cross-sectional view of the flow conditioning device taken along lines c—c in FIG. 4a;

DETAILED DESCRIPTION

The following description of the preferred embodiment is merely exemplary in nature and is in no way intended to limit the invention or its application or uses.

Figure 1:
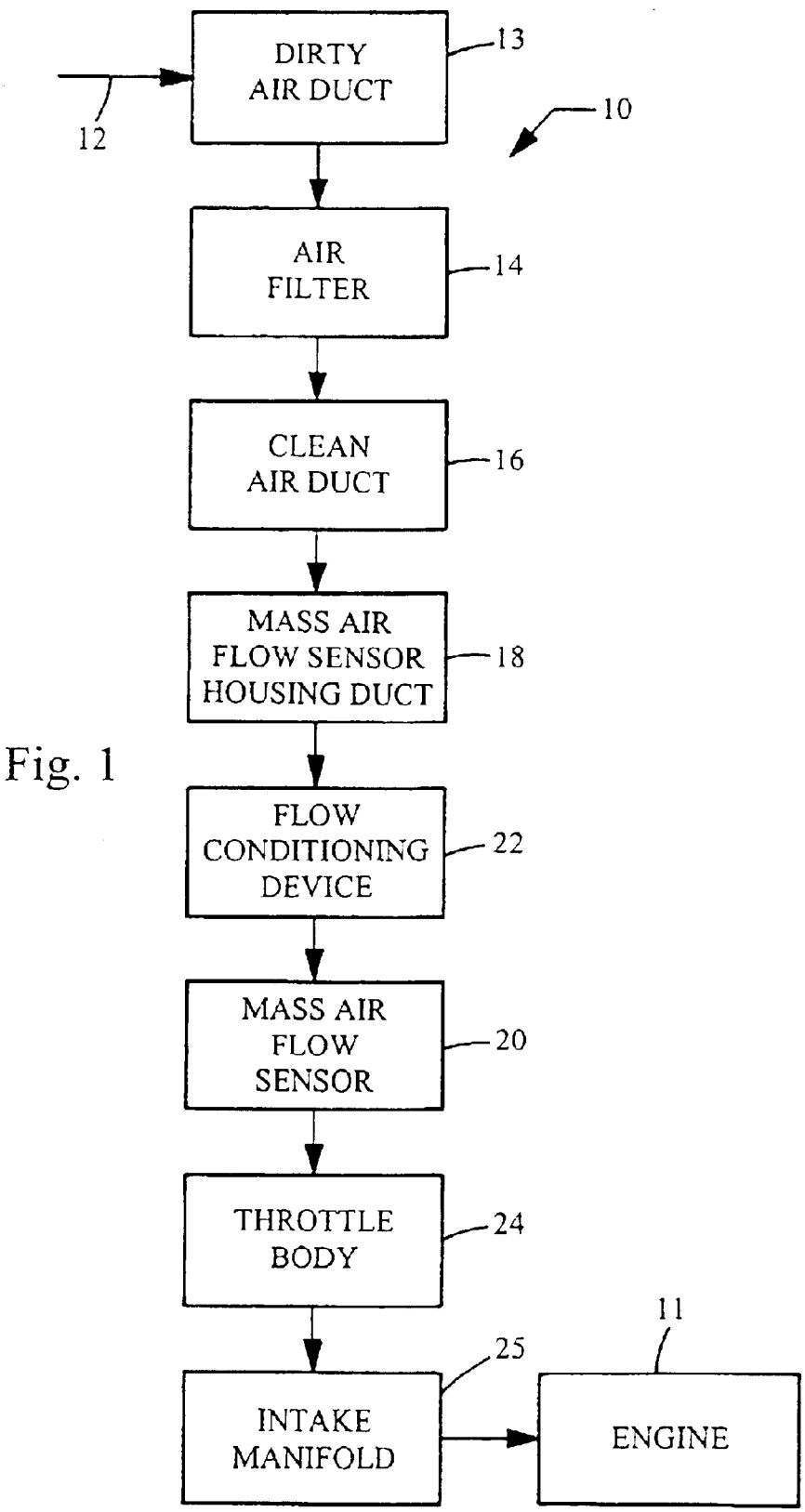
FIG. 1 is a block diagram of an air induction system in accordance with one embodiment of the present invention.

Referring in particular to FIG. 1, an air induction system installed in the vicinity of an engine 11 in an automobile is generally shown and represented by reference numeral 10. The air induction system 10, functions to filter and meter the air intake flow from the outside into the engine 11. The direction of the air flow from the outside to the engine is shown by reference numeral 12.

The air induction system 10 comprises a dirty air duct 13, an air filter 14, a clean air duct 16, a mass air flow sensor (MAFS) housing duct 18, a mass air flow sensor (MAFS) 20 and a flow conditioning device 22. The air induction system 10 also comprises a throttle body 24 connected to the MAFS housing 18. The drawings the throttle body 24 is typically connected to an intake manifold 25. The intake manifold 25 is connected to the engine 11. The throttle body 24 used in the present invention is well known in the art and therefore is not explained in detail.

The air filter 14 functions to filter the air drawn or inducted from the outside before it is delivered to the engine 11. The air filter 14 used in the present invention is well known in the art and therefore not explained in detail. The air filter 14 is connected to the clean air duct 16 such that the air after being filtered by the air filter 14 flows to the clean air duct 16.

Figure 2:
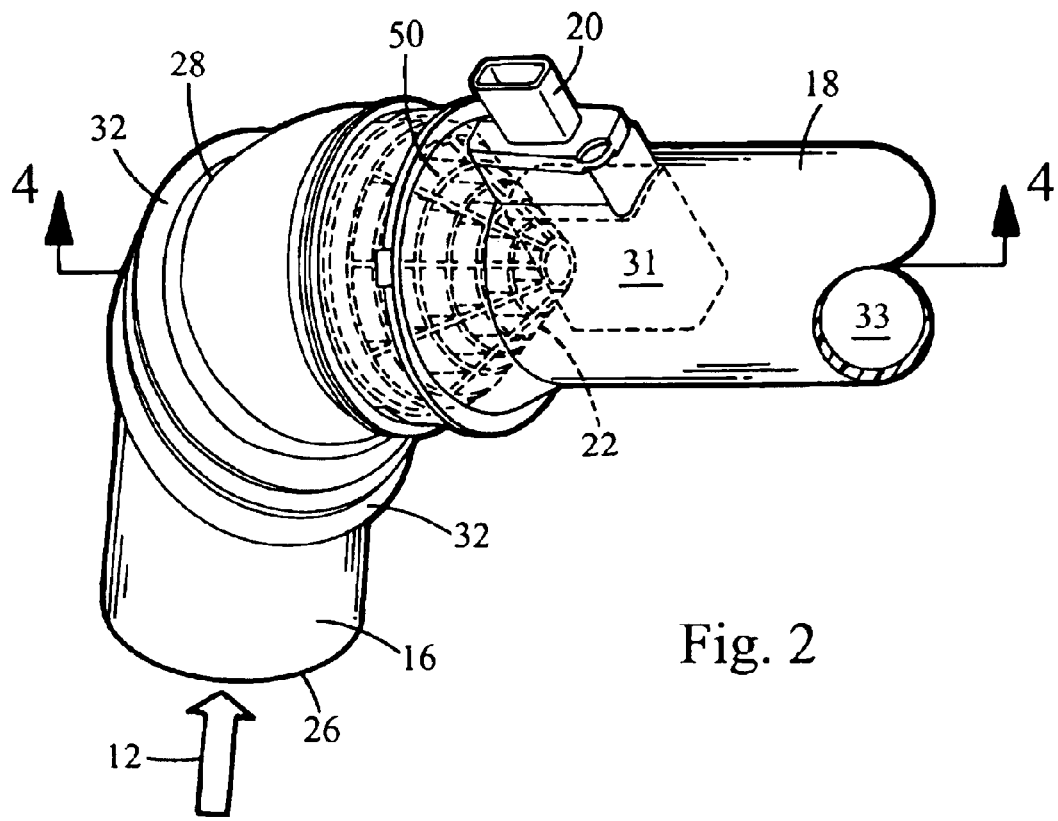
FIG. 2 is a perspective view of the air induction system in accordance with one embodiment of the present invention.
Figure 3:
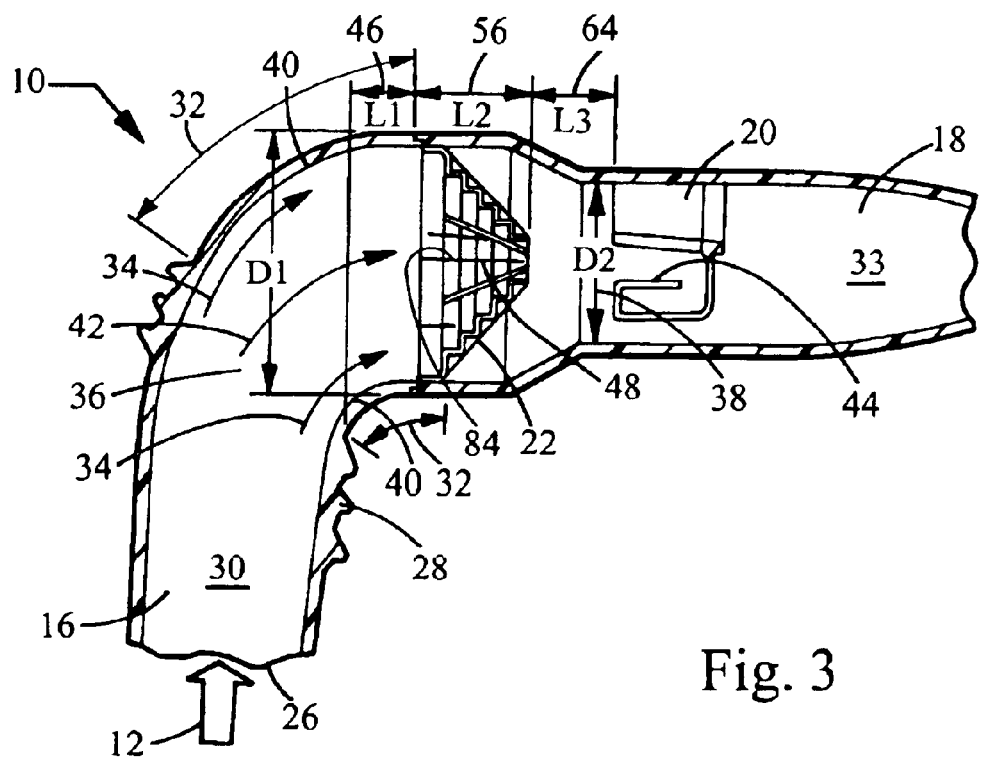
FIG. 3 is a perspective side view the air induction system of FIG. 2.

Referring in particular to FIGS. 2 and 3 the clean air duct 16 at one end 26 is connected to the air filter 14 (not shown in FIG. 1) and the second end 28 is connected to the MAFS housing duct 18. The clean air duct 16 has a hollow interior passage 30 that facilitates the flow of the air from the air filter 14 to the MAFS housing duct 18. In order to accommodate the limited space available in the motor vehicle, the clean air duct 16 defines an air tight bend 32. The air flowing through the bend 32 in the MAFS housing duct 18, defines a curved air flow path such that the air is expanded in the area of the bend 32. Referring in particular to FIG. 3, the diameter of the MAFS housing duct 18 in the area of the bend 32 is $D_1$ and is shown by reference numeral 36. The clean air duct 10 may be formed of any material such as plastic, metal, or composites and by any process known for manufacturing duct from such materials.

With continued reference to FIGS. 2 and 3, the MAFS housing duct 18, attached to the second end 28 of the clean air duct 16, functions to house the mass air flow sensor (MAFS) 20. The MAFS housing duct 18 defines an exterior surface 31 and an interior hollow passage 33 to allow air to flow through it. The MAFS housing duct 18 preferably has a reducing cross-section downstream from the bend 32 such that the diameter is $D_2$ represented by reference numeral 38. Since the cross section of MAFS housing duct 18 reduces in the direction of the air flow 12, the air accelerates as it passes through the MAFS housing duct 18.

The air flowing through the bend 32 may result in adverse pressure gradient due to the air encountering the interior wall 40 of the passage 30 in the clean air duct 16. Due to the air encountering the interior wall 40, the air shown by arrows 34 near the walls 40 of the clean air duct 16 is more turbulent than the air shown by arrow 42 around the center of the clean air duct 16. Turbulence is also caused due to inconsistent air flow 12 due to surface imperfections in the clean air duct 16 or the MAFS housing duct 18.

With continued reference to FIGS. 2 and 3, in order to measure the amount of air inducted into the engine, the air inductions system 10 includes a Mass Air Flow Sensor (MAFS) 20. The MAFS 20 is located downstream from the clean air duct 16 and upstream from the throttle body 24 directly in the path of the air flow 12. As mentioned above the MAFS 20 is housed inside the MAFS housing duct 18. Air enters MAFS 20 through a MAFS entrance 44 provided in MAFS 20. In order to convert the amount of air drawn into the engine 11 into a voltage signal, MAFS 20 is also provided with a sensor (not shown). The air passes from the MAFS entrance 44 to the sensor, where the exact amount of air is measured by the sensor. The MAFS entrance 44 is located downstream in the direction of air flow path 12 and is positioned directly behind the flow conditioning device 22. Therefore, the air exiting the flow conditioning device 22 directly enters the MAFS entrance 44 and is measured by the sensor provided in the MAFS 20.

Referring in particular to FIGS. 2–4c, in order to regulate the flow of the air before the air enters the MAFS opening 44, the air induction system 10 is provided with a means for conditioning the flow such as a flow conditioning device 22. As shown in the figures, the flow conditioning device 22 is preferably inserted inside the MAFS housing duct 18 and is disposed in the center of MAFS housing duct 18. Alternatively, it may be positioned between the clean air duct 16 and the MAFS housing duct 18. The flow conditioning device 22 is located in the air flow path 12 upstream from the MAFS entrance 44 but downstream from the bend 32 in the MAFS housing duct 18. Preferably, the flow conditioning device 22 is located at a distance $L_1$ (represented by reference numeral 46) from the bend 32. This distance $L_1$ can vary depending on the packaging of air induction system 10 inside the motor vehicle.

The flow conditioning device 22 is preferably mounted to or adjacent the second end of the clean air duct upstream of the sensor. The flow conditioning device extends toward the MAFS opening 40. As shown, the flow conditioning device 22 includes an outer body 41 having an air inlet end 60 and an air outlet end 62 through which clean ambient air passes from the air filter. In this embodiment, the air enters the flow conditioning device 22 from the MAFS housing duct 18 through the inlet end 60 and exits the flow conditioning device 22 through the outlet end 62 to the MAFS opening 40. The outlet end 62 of the flow conditioning device 22 is positioned at distance $L_3$ (as shown by reference number 64) from the MAFS entrance 44.

Figure 4A:
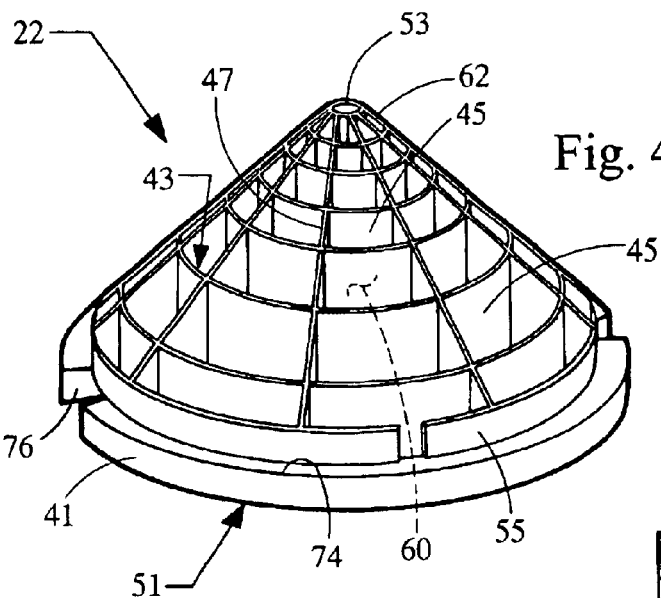
FIG. 4a is a perspective view of a flow conditioning device of the air induction system in accordance with one embodiment of the present invention.
Figure 4B:
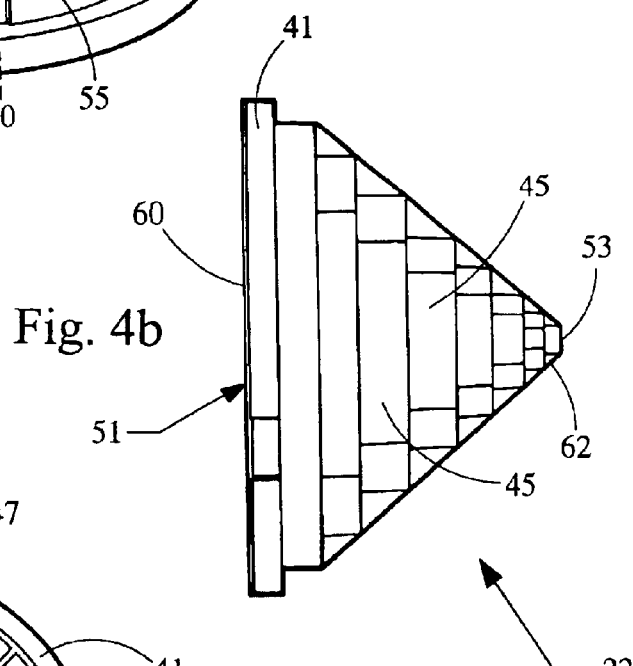
Figure 4C:
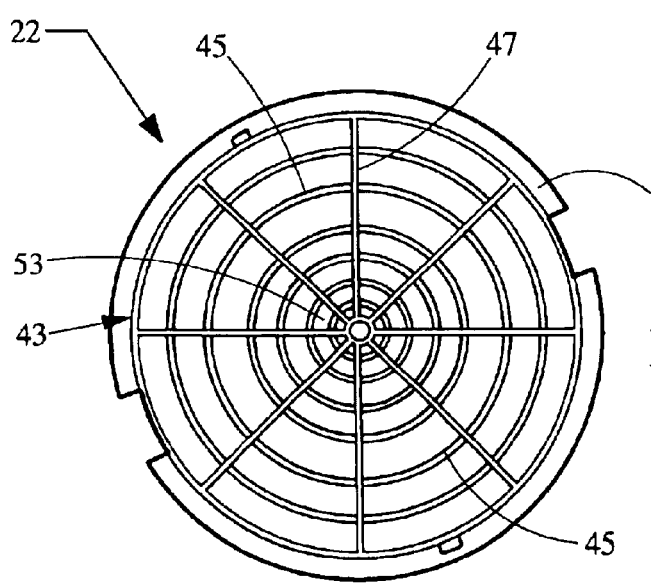

As shown in FIGS. 4a–4c, the flow conditioning device 22 has a configuration 43 of connected inner walls 45 disposed within the outer body. In this embodiment, the connected inner walls are arcuate and are coaxial with each other. The inner walls are spaced apart from each other by radially increasing intervals from the center of the configuration. In this embodiment, the configuration of inner walls further includes a plurality of ribs 47 attached to the outer body and radially extending inward to connect with a plurality of inner walls, thereby providing support to the device.

In FIGS. 3–4c, the air outlet end includes a face 51 through which clean air passes. As shown, the face has a center portion 53 and an outer portion 55 located about the center portion 53. The flow conditioning device is configured such that relatively low turbulent clean ambient air exits the center portions at the air outlet end 62. This is accomplished by radially outwardly spacing the inner walls in increasing intervals. It has been found that less intervals or space between the inner walls lowers the turbulence in the air flow. It has also been found that radially increasing the space between the inner walls 45 from the center of the face 51 allows sufficient clean air flow to the throttle body for air supply to the engine, thereby preventing undesirable pressure drop across the flow conditioning device.

It also has been found that there is a direct correlation between the length of the inner walls of the flow conditioning device and the reduction of turbulence in the air flow therethrough. Thus, in one embodiment, the inner walls of the flow conditioning device may have axial lengths which increase radially toward the center portion and decrease radially away from the center portion of the face of the outlet end. Of course, the lengths may be the same or vary based on vehicle restrictions.

Thus, in this embodiment, the center portion of the face includes relatively fine spaced inner walls in increasing space or intervals therein and the outer portion includes relatively course spaced inner walls in increasing space therein. As shown, the center portion of the face is in alignment with the MAFS 20 for allowing only low turbulent clean air to be received by the MAFS 20 and the outer portion of the face allows turbulent clean air flow towards the throttle body for air supply to the engine.

It is to be noted that the number of inner walls, the spacing between the inner walls, and the lengths of the inner walls may vary based on pressure gradient, air flow, and other variable restrictions as they may vary between vehicle engines.

The flow conditioning device 22 defines a longitudinal axis 48 that is parallel to the air flow 12. The length of the flow conditioning device $L_2$ is represented by reference numeral 56. Preferably the $L_2$ of the flow conditioning device 22 is such that the air passing through the flow conditioning device 22 is streamlined before the air enters the MAFS entrance 44. The flow conditioning device 22 may be made by any suitable means such as die molding or injection molding.

Figure 5:
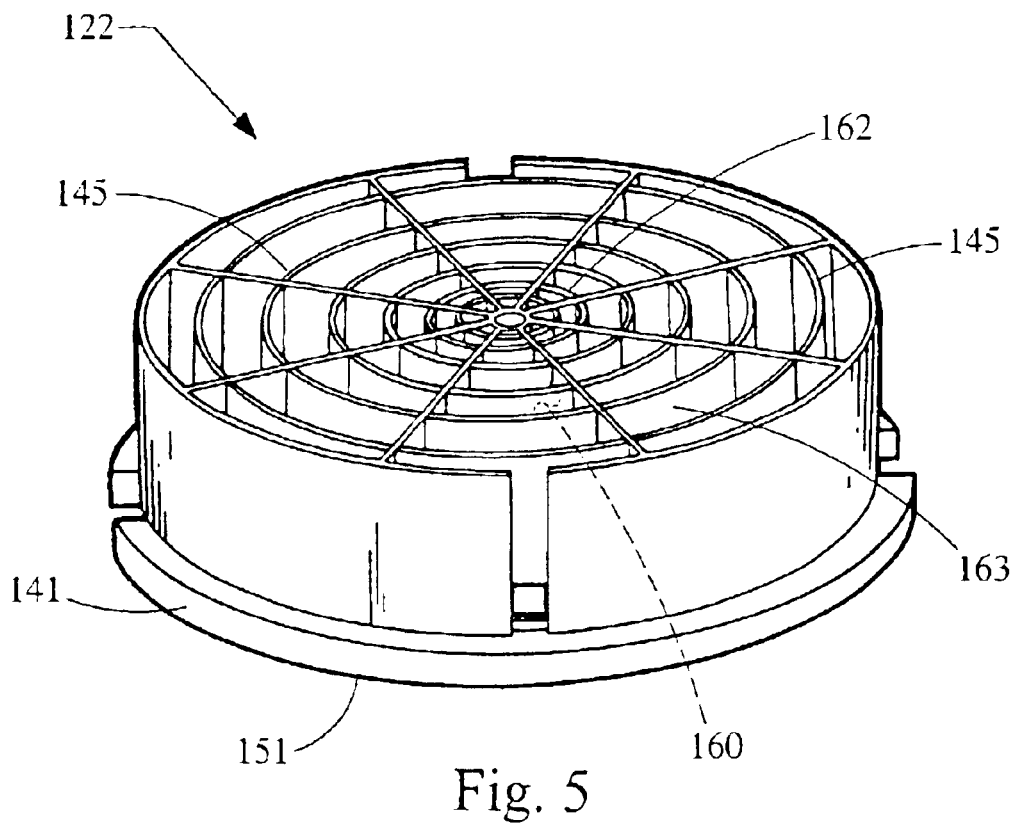
FIG. 5 is a perspective view of a flow conditioning device of the air induction system in accordance with another embodiment of the present invention.

Referring to FIG. 5, an alternate embodiment of the flow conditioning device is shown and is indicated by reference numeral 122. In this embodiment, the flow conditioning device 122 includes similar components as a flow conditioning device 22, such as a body 141, an air inlet end 160, an air outlet end 162, and a face 151. The flow conditioning device 122 further includes a configuration of inner walls having an arcuate structure 163 as in flow conditioning device 22. However, as shown, the lengths of the connected inner walls 145 are equal to each other. As in the embodiment mentioned above, the inner walls are also spaced apart in radially increasing increments from the center of the face.

Figure 6:
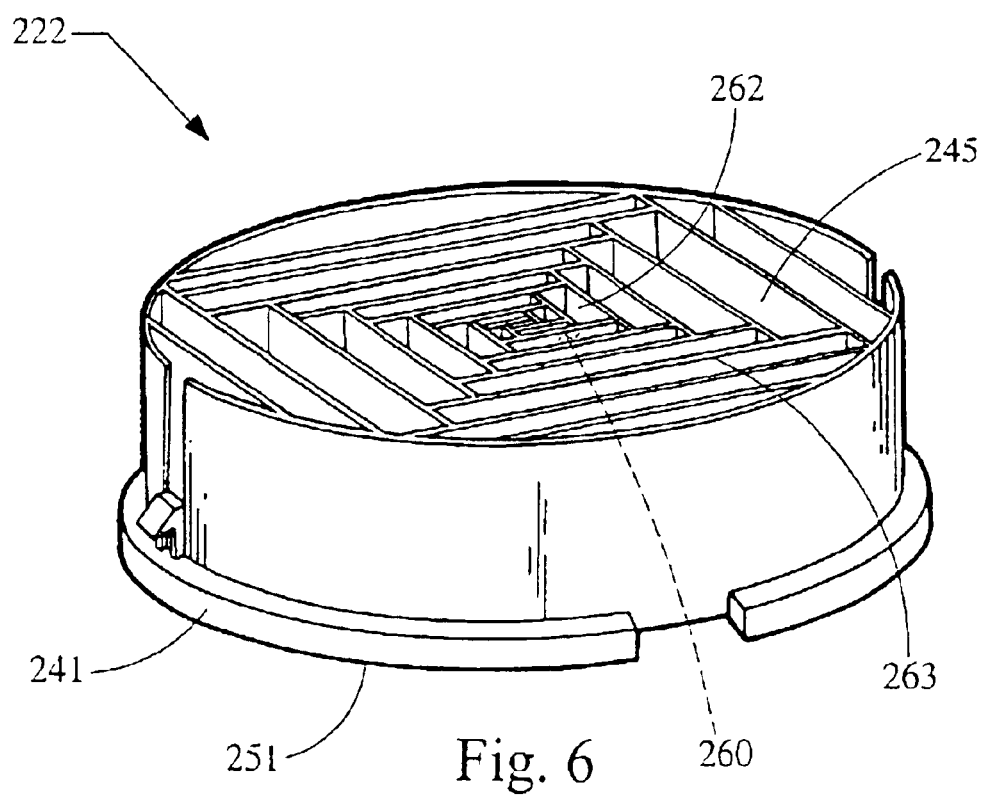
FIG. 6 is a perspective view of a flow conditioning device of the air induction system in accordance with yet another embodiment of the present invention.

Referring in particular to FIG. 6, another alternate embodiment of the flow conditioning device is shown and is indicated by reference numeral 222. In this embodiment, the flow conditioning device 222 includes similar components as the flow conditioning device 22, such as a body 241, an air inlet end 260, an air outlet end 262, and a face 251. However, flow conditioning device 222 includes a configuration of inner walls having a planar structure 263. As in the embodiment mentioned above, the inner walls also are space apart in radially increasing increments from the center of the face.

In order to mount the flow conditioning device 22 to the MAFS housing duct 18, the external surface 50 of the flow conditioning device 22 is provided with a fastening mechanism. As shown, the inlet end 60 of the flow conditioning device 22 preferably has an outwardly extending rim 74 that fits around the MAFS housing duct 18. Preferably, the rim 74 is provided with a plurality of locking devices 76 such that the flow conditioning device 22 can be securely locked to the MAFS housing duct 18.

Referring in particular to FIGS. 2–4c, the flow of air through various components in the air induction system is shown in detail. As shown, the air flow from the air filter 14 to the clean air duct 16 is generally shown by reference numeral 12. As explained above, as air passes through the bend 32 in clean air duct 16, the air may become turbulent near the walls 40 of the passage 30. As described above, the turbulent air near the walls 40 of the clean air duct 16 is represented by reference numeral 34. The less turbulent air around the center of clean air duct 16 is represented by reference numeral 42. As explained above, the flow conditioning device 22 is oriented around the center of MAFS housing duct 18. Therefore, only the air 42 around the center of clean air duct 18 enters through the inlet 60 of the flow conditioning device 22. Since the MAFS entrance 44 is aligned with the outlet 62 of the flow conditioning device 22, only the air exiting the center of the outlet 62 shown by reference numeral 84 enters the MAFS entrance 44. The turbulent air 34 passes through the outside surface 50 of the center portion, thereby bypassing the MAFS entrance 44. Since the flow conditioning device 22 reduces the turbulence of the air flow 34 when entering the MAFS entrance 44, there is substantial improvement in the noise to signal output measured by MAFS 20.

As shown, since the flow conditioning device 22 can be manufactured separate from the other components in air induction system 10, it allows flexibility in the positioning and the dimensions in manufacturing of the flow conditioning device 22. For example, depending on the packaging of the air induction system 10, the distance $L_1$ can be either increased or decreased. Additionally, the length and the distance from MAFS 20 can be also changed.

As any person skilled in the art will recognize from the previous description and from the figures and claims, modifications and changes can be made to the preferred embodiment of the invention without departing from the scope of the invention as defined in the following claims.

What is claimed is:

1. An air induction system for inducing ambient air to a vehicle engine, the system comprising:
    an air filter for filtering the ambient air;
    a clean air duct in fluid communication with the air filter, the clean air duct having first and second ends, the first end being connected to the air filter, the duct defining a clean air passage for carrying clean air from the air filter;
    a sensor mounted adjacent the second end of the duct, the sensor being configured to receive the ambient air; and
    a flow conditioning device mounted adjacent the clean air duct and upstream of the sensor, the flow conditioning device including an outer body having an air inlet end and an air outlet end, the flow conditioning device having a configuration of connected inner walls disposed within the body and spaced apart from each other by radially increasing intervals from the center of the configuration, the connect inner walls being coaxial with each other and having an axial length decreasing radially from the center of the configuration.

2. The system of claim 1 wherein the flow conditioning device is mounted to the second end of the clean air duct.

3. The system of claim 1 wherein the flow conditioning device includes at least one rib attached to the outer body and extending to at least one of the inner walls.

4. The system of claim 1 wherein the air outlet end includes a face through which clean air passes, the face having a center portion through which low turbulent air passes and an outer portion being about the center portion and through which high turbulent air passes.

5. The system of claim 4 wherein the sensor is located downstream of the flow conditioning device and aligned with the center portion of the face of the air outlet end to receive low turbulent air.

6. The system of claim 1 wherein the duct further comprises a clean air portion and a sensor housing portion, the sensor being disposed in the sensor housing portion.

7. The system of claim 3 wherein the body is engaged with the sensor housing portion.

8. The system of claim 1 wherein the inner walls are arcuately formed.

9. The system of claim 1 wherein the inner walls are planar.

10. A flow conditioning device for an air induction system to transport ambient air into an engine of an automobile, the flow conditioning device comprising:
    an inner body having an air inlet end and an air outlet end; and
    a configuration of connected inner walls disposed within the inner body and spaced apart from each other by radially increasing intervals from the center of the configuration of connected inner walls, the connected inner walls being coaxial with each other and having an axial langth decreasing radially from the center of the configuration.

11. The device of claim 10 wherein the flow conditioning device includes at least one rib attached to the outer body and extending to at least one of the inner walls.

12. The device of claim 10 wherein the air outlet end includes a face through which clean air passes, the face having a center portion through which low turbulent air passes and an outer portion being about the center portion and through which high turbulent air passes.

13. The device of claim 10 wherein the inner walls are arcuately formed.

14. The device of claim 10 wherein the inner walls are planar.

* * * * *